(12) United States Patent
Jang et al.

(10) Patent No.: US 8,860,890 B2
(45) Date of Patent: Oct. 14, 2014

(54) ELECTRONIC DEVICE AND CONTROL METHOD THEREOF

(71) Applicant: Samsung Electronics Co., Ltd., Suwon-si (KR)

(72) Inventors: Young-ick Jang, Seoul (KR); Chang-yong Kim, Yongin-si (KR); Jong-hyuk Jang, Gunpo-si (KR); Jea-hee Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/955,701

(22) Filed: Jul. 31, 2013

(65) Prior Publication Data
US 2014/0118624 A1    May 1, 2014

(30) Foreign Application Priority Data

Oct. 30, 2012  (KR) ........................ 10-2012-0121659

(51) Int. Cl.
| | | |
|---|---|---|
| H04N 5/63 | (2006.01) | |
| H04N 21/426 | (2011.01) | |
| H04N 21/4223 | (2011.01) | |
| H04N 21/443 | (2011.01) | |
| H04N 21/422 | (2011.01) | |

(52) U.S. Cl.
CPC .............. *H04N 5/63* (2013.01); *H04N 21/426* (2013.01); *H04N 21/4223* (2013.01); *H04N 21/4436* (2013.01); *H04N 21/42203* (2013.01)
USPC ........... 348/730; 348/725; 348/734; 348/719; 348/706; 348/567; 348/656; 348/372; 348/333.13; 348/220.1; 348/208.16; 348/14.16; 348/14.03; 725/37; 725/39; 725/40; 725/68; 725/79; 725/115; 725/116; 725/130; 725/146; 725/150; 725/151; 713/193; 713/310; 713/320; 713/323; 713/340

(58) Field of Classification Search
USPC ............ 348/730, 725, 734, 567, 372, 333.13, 348/220.1, 208.16, 14.16, 14.03; 725/39, 725/40, 115, 150, 151, 37, 68, 79, 116, 130, 725/146; 713/193, 310, 322, 340, 320, 323
See application file for complete search history.

(56) References Cited

U.S. PATENT DOCUMENTS

| | | |
|---|---|---|
| 6,070,140 A | 5/2000 | Tran |
| 6,369,643 B1 | 4/2002 | Lee et al. |

(Continued)

FOREIGN PATENT DOCUMENTS

EP    1 341 380 A1    9/2003

OTHER PUBLICATIONS

Communication dated Dec. 10, 2013 issued by the International Searching Authority in counterpart Application No. PCT/KR2013/006900 (PCT/ISA/210).

(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

An electronic device and a control method thereof are disclosed, the electronic device including: an operation implementation unit conducting a predetermined operation; a first main controller controlling the operation of the operation implementation unit; an input reception unit receiving an input signal; a second main controller processing the input signal and being in the power saving state in the standby mode; and a subcontroller controlling the second main controller to process the input signal when the input signal is received in the standby mode, wherein the second main controller processes the received input signal according to control of the subcontroller, controls the first main controller to operate in the normal mode when the input signal corresponds to entering the normal mode, and returns to the power saving state in the standby mode when the input signal does not correspond to entering the normal mode.

21 Claims, 6 Drawing Sheets

(56) References Cited

U.S. PATENT DOCUMENTS

| | | | |
|---|---|---|---|
| 7,454,635 B2* | 11/2008 | Ito et al. | 713/322 |
| 8,258,922 B2* | 9/2012 | Shu et al. | 340/7.33 |
| 2001/0020276 A1* | 9/2001 | Kim et al. | 713/202 |
| 2002/0021372 A1* | 2/2002 | Konda et al. | 348/730 |
| 2004/0128137 A1 | 7/2004 | Bush et al. | |
| 2005/0094036 A1* | 5/2005 | Tichelaar | 348/730 |
| 2006/0156047 A1* | 7/2006 | Ito et al. | 713/310 |
| 2007/0260358 A1 | 11/2007 | Katoh | |
| 2007/0288597 A1* | 12/2007 | Chang et al. | 709/217 |
| 2008/0229132 A1 | 9/2008 | Suga et al. | |
| 2011/0058206 A1 | 3/2011 | Park et al. | |
| 2011/0134251 A1 | 6/2011 | Kim et al. | |
| 2011/0138416 A1* | 6/2011 | Kang et al. | 725/39 |
| 2011/0163602 A1* | 7/2011 | Joo et al. | 307/66 |
| 2011/0320886 A1* | 12/2011 | Suzuki et al. | 714/48 |
| 2012/0137156 A1 | 5/2012 | Huang et al. | |

OTHER PUBLICATIONS

Communication dated Mar. 11, 2014 issued by the European Patent Office in counterpart European Patent Application No. 13189365.3.

"Minimizing Power Consumption in Micro-Processor Based Systems which Utilize Speech Recognition Devices"; IBM Technical Disclosure Bulletin; vol. 37; No. 10; Oct. 1, 1994; XP000475611; pp. 151-153.

* cited by examiner

ELECTRONIC DEVICE AND CONTROL METHOD THEREOF

CROSS-REFERENCE TO RELATED APPLICATION

This application claims priority from Korean Patent Application No. 10-2012-0121659, filed on Oct. 30, 2012, in the Korean Intellectual Property Office, the entire disclosure of which is incorporated herein by reference.

BACKGROUND

1. Field

Apparatuses and methods consistent with the exemplary embodiments relate to an electronic device and a control method thereof, more particularly to an electronic device having a standby mode to save power and a control method thereof.

2. Description of the Related Art

An electronic device, such as a TV, has a normal mode for normal operation and a standby mode for power saving. According to a recent power consumption standard, an electronic device is required to use, for example, 0.5 Watt or less in standby mode.

An electronic device may need to receive a user input in the standby mode to enter the normal mode. For example, when a power on command is received from a user through a remote controller or a manipulation panel in a power off state, an electronic device, such as a TV, enters the normal mode and operates.

With recent advancement of input methods, various forms of input, for example, via voices and gestures as well as through manipulation instructions using a remote controller and a manipulation panel, are widely used.

However, in order to receive and process various types of inputs including those through voices and gestures, a configuration having relevant processing capability (processor) is needed, which generally involves great power consumption and thus does not satisfy the aforementioned power consumption standard in the standby mode.

Specifically, FIG. 6 illustrates an electronic device 6 according to related art. In the standby mode, a power supply unit 66 does not supply power to an operation implementation unit 61 performing major functions of the electronic device 6 and a main controller 62 including a main processor. Meanwhile, a subcontroller 65 including a subprocessor identifies whether an input signal for wake-up from the standby mode is received through an input reception unit 63 while operating normally in the standby mode. When the input signal for wake-up from the standby mode is received, the subcontroller 65 controls the main controller 62 to wake up and operate so that power is supplied to the operation implementation unit 61. There is no problem when the subcontroller 65 consumes considerably low power simply to process a key input value, for example, when the input signal is a power on signal of a remote controller. However, when analysis of details of an input signal, such as a voice or a motion, is needed, substantial power is used to drive an analysis engine, and the electronic device may not meet the power consumption standard in the standby mode.

SUMMARY

An aspect of one or more exemplary embodiments is to provide an electronic device capable of performing entrance to a normal mode in accordance with various types of inputs while minimizing power consumption in a standby mode and a control method thereof.

The foregoing and/or other aspects may be achieved by providing a device including: an operation implementor configured to conduct a predetermined operation; a first main controller configured to control the operation of the operation implementor in a normal mode when in a power saving state in a standby mode; an input receiver configured to receive an input signal; a second main controller configured to process the input signal when in the power saving state in the standby mode; and a subcontroller configured to control the second main controller to process the input signal when the input signal is received in the standby mode, wherein the second main controller processes the received input signal according to control of the subcontroller, controls the first main controller to operate in the normal mode when the input signal corresponds to entering the normal mode, and returns to the power saving state in the standby mode when the input signal does not correspond to entering the normal mode.

The device may further include a storage which stores information about the input signal, wherein the second main controller may process the input signal based on the information about the input signal stored in the storage. The second main controller may be initialized before storing the input signal in the storage The second main controller may start an initialization according to the control of the subcontroller, and the subcontroller may transmit the information about the input signal stored in the storage to the second main controller when the initialization of the second main controller is completed.

The subcontroller may include a first subcontroller controlling the first main controller to operate in the normal mode according to control of the second main controller when the input signal corresponds to the entering the normal mode, and the subcontroller comprises a second subcontroller controlling the second main controller to process the input signal when the input signal is received in the standby mode.

The input receiver may include a first input receiver configured to receive the input signal including a first instruction, and the second main controller may include a main voice recognizer configured to determine whether the first instruction corresponds to entering the normal mode.

The second subcontroller may include a sub-voice recognizer configured to conduct voice-preprocessing of the input signal.

The input receiver may further include a second input receiver configured to receive the input signal including a second instruction, and the first subcontroller may control the first main controller to operate in the normal mode when the manipulation instruction corresponds to entering the normal mode.

The operation implementation unit may include a signal receiver configured to receive an image signal, an image processor configured to process the image signal, and a display unit which displays an image based on the processed image signal.

The foregoing and/or other aspects may also be achieved by providing a control method of a device including an operation implementation unit conducting a predetermined operation, a first main controller controlling the operation of the operation implementation unit when in a normal mode and when in a power saving state in a standby mode, and a second main controller processing an input signal when in the power saving state in the standby mode, the control method including: receiving the input signal in the standby mode; controlling the second main controller to process the input signal; by the second main controller, processing the received input signal; and by the second main controller, controlling the first main controller to operate in the normal mode when the input signal corresponds to entering the normal mode and returning to the power saving state in the standby mode when the input signal does not correspond to entering the normal mode.

The control method may further include storing information about the input signal, wherein the processing the input signal may include processing the input signal based on the information about the stored input signal. The method may further comprise initializing the second main controller before storing the input signal.

The control method may further include: by the second main controller, starting an initialization according to control of a subcontroller; and transmitting the information about the stored input signal stored to the second main controller when the initialization of the second main controller is completed.

The control method may further include controlling the first main controller to operate in the normal mode according to control of the second main controller when the input signal corresponds to the entering the normal mode.

The input signal may include a first instruction, and the processing the input signal may include determining whether the first instruction corresponds to entrance to the normal mode. The first instruction may comprise a user voice instruction.

The control method may further include conducting voice-preprocessing of the input signal.

The input signal may further include a second instruction, and the method may further include controlling the first main controller to operate in the normal mode when the second instruction corresponds to entering the normal mode. The second instruction may comprise a user manipulation instruction.

The control method may further include, by the operation implementation unit, receiving an image signal, processing the image signal, and displaying an image based on the processed image signal.

Yet another exemplary embodiment provides a device comprising: an operation implementor configured to conduct an operation; a first main controller configured to control the operation of the operation implementor; an input receiver configured to receive an input signal; a second main controller configured to process the input signal when in a standby mode; and a subcontroller configured to control the second main controller to process the input signal when the input signal is received in the standby mode, wherein at least one from among the second main controller and the subcontroller consumes less power than at least one from among the first main controller and the operation implementor.

In the standby mode, at least one from among the operation implementor and the first main controller may not be supplied with power.

In the standby mode, at least one from among the input receiver and the subcontroller may operate.

In standby mode, the second main controller may intermittently operate only when a signal is input.

According to yet another exemplary embodiment, there is provided a control method of a device comprising an operation implementation unit conducting an operation, a first main controller controlling the operation of the operation implementation unit, and a second main controller processing an input signal when in the power saving state in the standby mode, the control method comprising: receiving the input signal in the standby mode; controlling the second main controller to process the input signal; by the second main controller, processing the received input signal; and wherein the second main controller consumes less power than at least one from among the first main controller and the operation implementation unit.

In the standby mode, at least one from among the operation implementation unit and the first main controller may not be supplied with power.

In the standby mode, the second main controller may intermittently operate only when a signal is input.

In standby mode, the second main controller may intermittently operate only when a signal is input.

As described above, according to one or more exemplary embodiments, an electronic device is capable of performing entrance to a normal mode in accordance with various types of inputs while minimizing power consumption in a standby mode.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
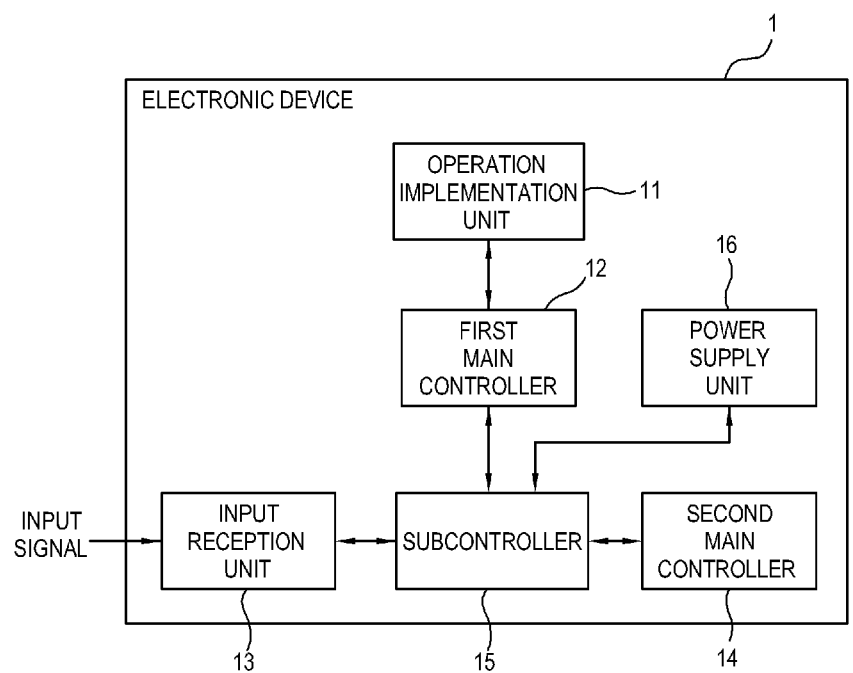
FIG. 1 is a block diagram illustrating a configuration of an electronic device according to an exemplary embodiment.

Hereinafter, exemplary embodiments will be described in detail with reference to accompanying drawings. FIG. 1 is a block diagram illustrating a configuration of an electronic device according to an exemplary embodiment. The electronic device 1 may be configured as a home appliance, such as a television (TV). The electronic device 1 has a normal mode for normal operation and a standby mode for power saving. In the standby mode of the present exemplary embodiment, power is not supplied to main components of the electronic device 1 consuming relatively greater power while only subcomponents of the electronic device 1 using relatively less power are operational. For example, when in a normal mode, a TV as the electronic device 1 switches to the standby mode when a power off command is input through a remote control (not shown) or a manipulation panel (not shown).

In the standby mode, the components of the electronic device 1 consume a preset level or less of power. When user input is received in the standby mode, the electronic device 1 wakes up from the standby mode to the normal mode and operates normally. For example, when a power on command of the user is input in the standby mode, a TV as the electronic device 1 may return to the normal mode.

Referring to FIG. 1, the electronic device 1 includes an operation implementation unit 11, a first main controller 12, an input reception unit 13, a second main controller 14, a subcontroller 15, and a power supply unit 16. The operation implementation unit 11 operates a predetermined operation of the electronic device 1. For example, when the electronic device is provided as a TV, the operation implementation unit 11 receives and processes an image signal and displays an image based on the processed image signal. The operation implementation unit 11 may perform various operations based on operations and functions of the electronic device 1, without being limited thereto. The operation implementation unit 11 is supplied with power from the power supply unit 16 and operates normally in the normal mode, and may not be supplied with power for power saving in the standby mode. In FIG. 1, lines for supplying power from the power supply unit 16 to the components are not shown for convenience.

The first main controller 12 is a main controller of the electronic device 1, which controls an operation of the operation implementation unit 11. The first main controller 12 includes a central processing unit (CPU) and operates by running a control program. The first main controller 12 may further include a nonvolatile memory, such as a flash memory to store the control program, and a double data rate (DDR) volatile memory to load at least part of the stored control program for the CPU to quickly access. The control program of the first main controller 12 is programmed with contents to control the operation of the operation implementation unit 11. The first main controller 12 is supplied with power from the power supply unit 16 to operate normally in the normal mode and is not supplied with power for power saving in the standby mode.

The input reception unit 13 receives an input signal in the standby mode. The input signal may include, for example, a power on command of a user. The power on command of the user may be input, for example, by a voice.

The second main controller 14 processes the input signal received through the input reception unit 13. The second main controller 14 is configured as a microprocessor capable of processing the input signal. The second main controller 14 consumes less power than the first main controller 12.

The subcontroller 15 controls an operation of the second main controller 14 in the standby mode and is configured as a microprocessor. The subcontroller 15 also consumes less power than the first main controller 12.

In the standby mode, the operation implementation unit 11 and the first main controller 12, which consume relatively greater power, are not supplied with power, while the input reception unit 13 and the subcontroller 15, which consume relatively less power, operate.

Meanwhile, the second main controller 14 does not operate and does not consume power basically to save power in the standby mode. However, when a signal is input, the second main controller 14 intermittently operates to process the input signal. In this case, the second main controller 14 may consume power.

Table 1 shows characteristics of a power mode according an exemplary embodiment.

TABLE 1

|  | Normal mode | Standby mode |
| --- | --- | --- |
| First main controller | ON | OFF |
| Subcontroller | ON | ON |
| Second main controller | ON | ON/OFF |

In Table 1, 'ON' represents a state that a component conducts a predetermined operation and consumes power, while 'OFF' represents a state that a component does not operate and does not consume power. As illustrated in Table 1, in the standby mode, the second main controller 14 is basically in the 'OFF' state and switches to the 'ON' state to operate if necessary, instead of being always in the 'ON' state or in the 'OFF' state. In this way, according to the present exemplary embodiment, the second main controller 14, when needed to process an input signal, intermittently operates in the standby mode, thereby minimizing power consumption of the electronic device 1.

Figure 6:
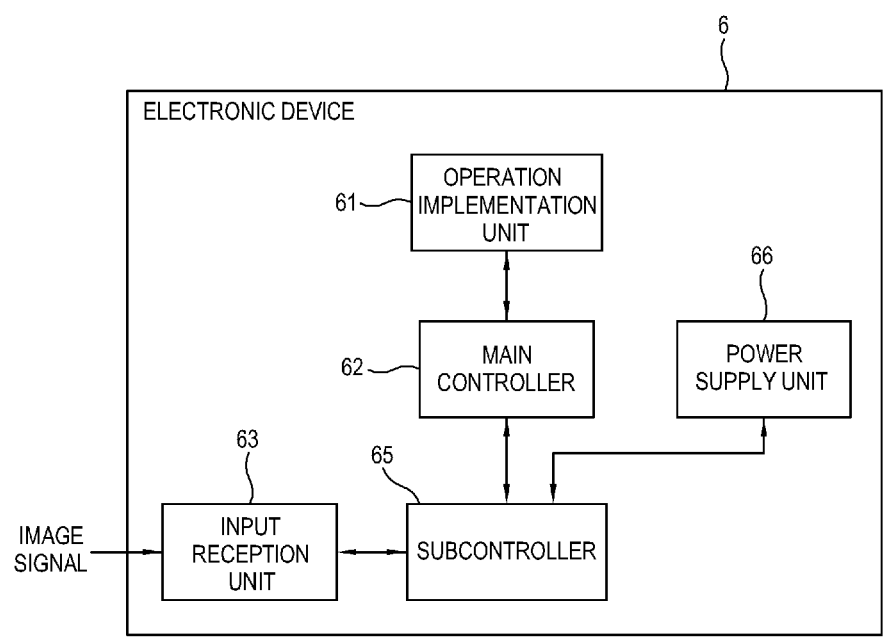
FIG. 6 is a block diagram illustrating a configuration of an electronic device according to related art.

That is, comparing the electronic device 1 with the electronic device 6 according to related art shown in FIG. 6, the second main controller 14 of FIG. 1 may be substituted for an input signal processing function requiring substantial power consumption in the standby mode, which is what occurs in the subcontroller 65 of FIG. 6, so that the subcontroller 15 of FIG. 1 is configured to consume less power simply to process an input signal and satisfy a power consumption standard in the standby mode.

Figure 2:
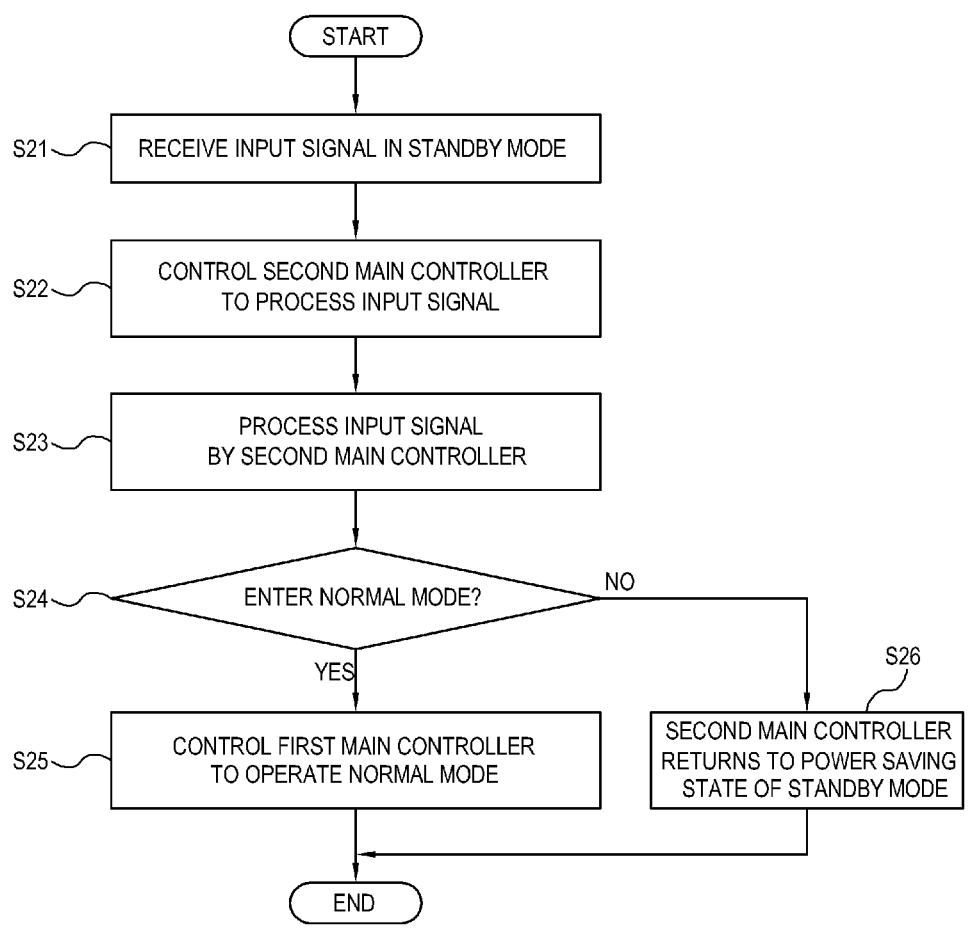
FIG. 2 is a flowchart illustrating an operation of the electronic device according to an exemplary embodiment.

FIG. 2 is a flowchart illustrating an operation of the electronic device 1 of FIG. 1. In an exemplary embodiment shown in FIG. 2, the electronic device 1 is in the standby mode. As described above, the operation implementation unit 11, the first main controller 12, and the second main controller 14 do not consume power in the standby mode. In operation S21, the input reception unit 13 receives an input signal in the standby mode. In operation S22, the subcontroller 15 controls the second main controller 14 to process the received input signal. For example, the subcontroller 15 may send a wake-up signal to the second main controller 14 to wake up and operate.

In operation S23, when the second main controller 14 wakes up, the second main controller 14 processes the input signal. The second main controller 14 may receive information about the input signal from the subcontroller 15 or directly from the input reception unit 13. In operation S24, the second main controller 14 analyzes the information about the input signal and determines whether the input signal corresponds to entrance to the normal mode. For example, the input signal includes a voice instruction of the user, and the second main controller 14 analyzes the voice and determines whether the voice instruction corresponds to a power on command.

When the input signal corresponds to entrance to the normal mode in operation S24, the first main controller 12 is controlled to operate in the normal mode in operation S25. For example, when the voice instruction is a power on command, the second main controller 14 generates and transmits an interrupt to the subcontroller 15. The subcontroller 15 controls the first main controller 12 to operate in the normal mode based on the interrupt from the second main controller 14. For instance, the subcontroller 15 controls a switch (not shown) of the power supply unit 16 to supply power to the first main controller 12. Accordingly, the first main controller 12 wakes up from the standby mode and operates normally. Alternatively, the second main controller 14 may directly control the first main controller 12 to operate in the normal mode, not via the subcontroller 15.

When the input signal does not correspond to entrance to the normal mode in operation S24, the second main controller 14 returns to a power saving state of the standby mode and minimizes power consumption in operation S26. When returning to the power saving state of the standby mode, the second main controller 14 transmits information indicating the return to the subcontroller 15 so that the subcontroller 15 recognizes the operation state of the second main controller 14.

Figure 3:
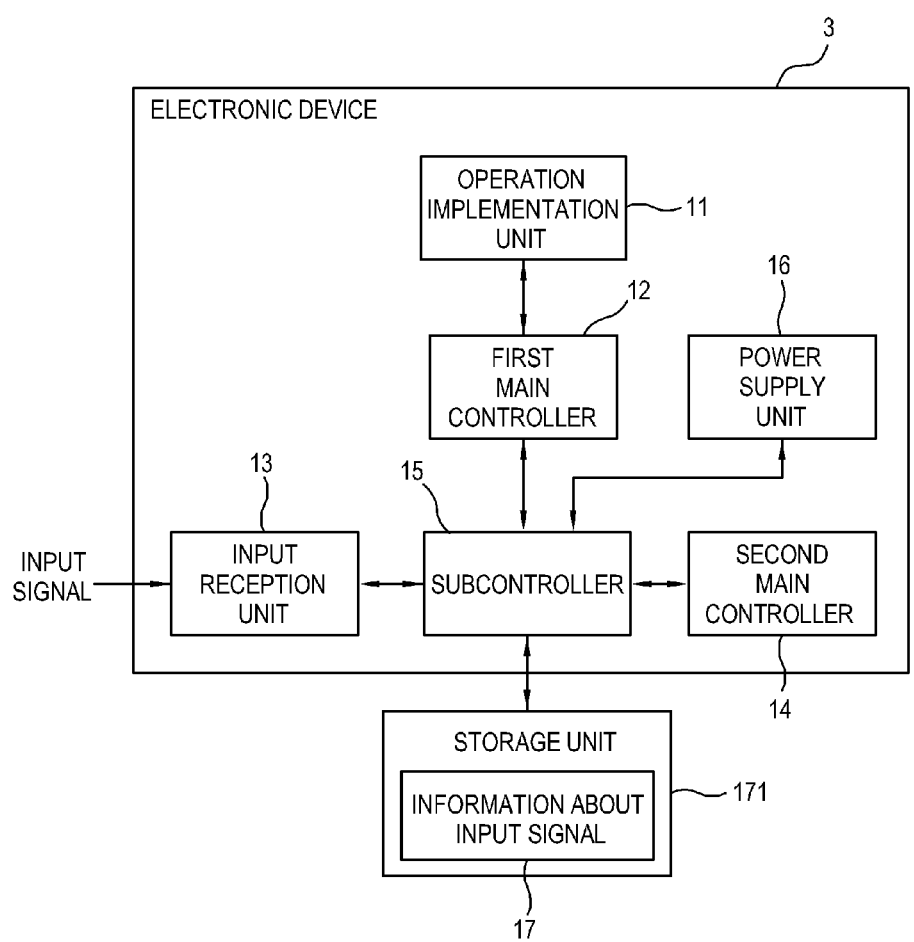
FIG. 3 is a block diagram illustrating a configuration of an electronic device according to another exemplary embodiment.

FIG. 3 is a block diagram illustrating a configuration of an electronic device according to another exemplary embodiment. The electronic device 3 includes an operation implementation unit 11, a first main controller 12, an input reception unit 13, a second main controller 14, a subcontroller 15, a power supply unit 16, and a storage unit 17. Equivalent or similar components of the electronic device 3 to those of the electronic device 1 described with reference to FIGS. 1 and 2 will be omitted herein.

Figure 4:
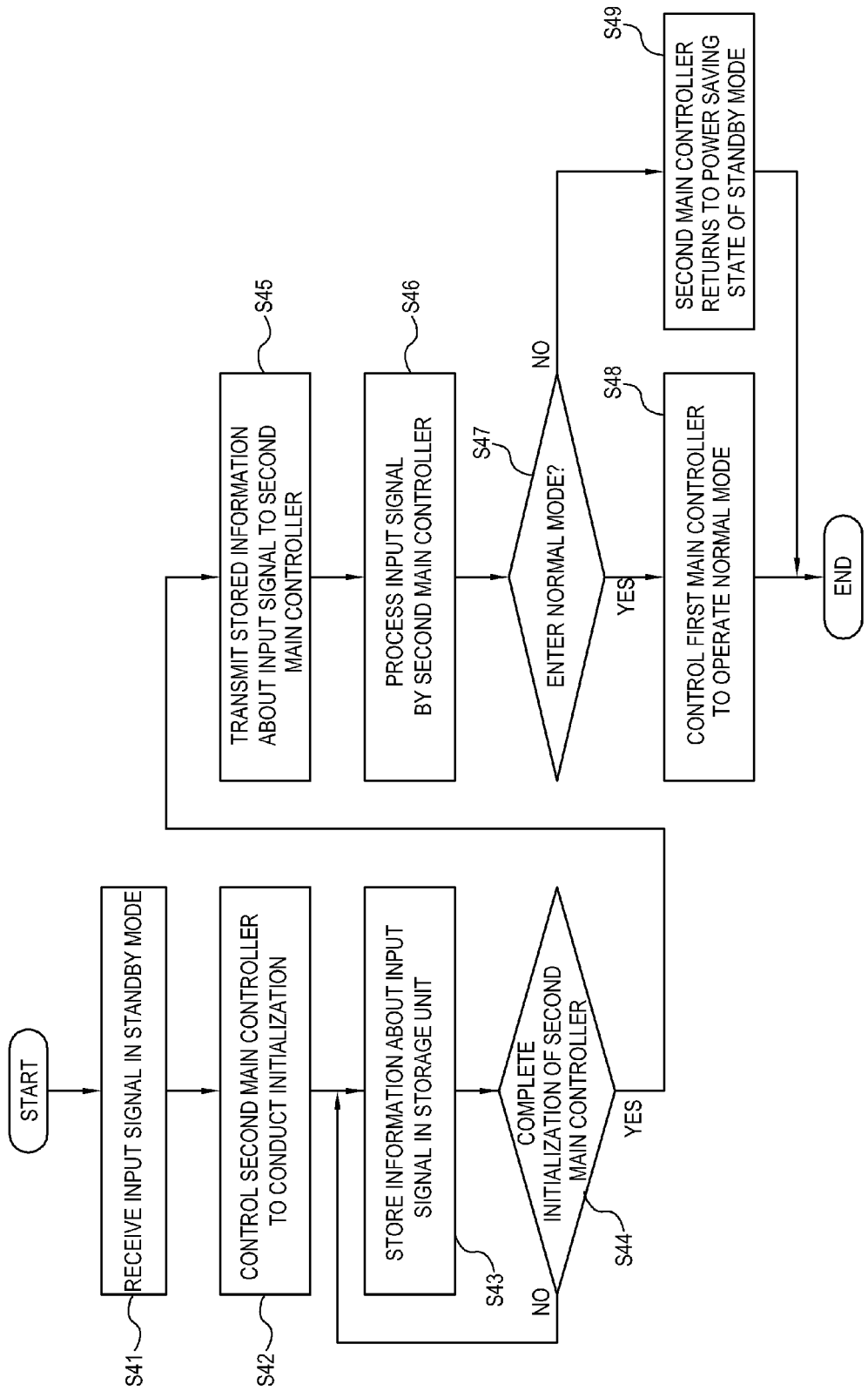
FIG. 4 is a flowchart illustrating an operation of the electronic device according to an exemplary embodiment.

The storage unit 17 is a buffer memory, which stores information 171 about an input signal. The electronic device 3 will be described in detail with reference to FIG. 4. FIG. 4 is a flowchart illustrating an operation of the electronic device 3 of FIG. 3. In an exemplary embodiment shown in FIG. 3, the electronic device 3 is in the standby mode. In the standby mode, the operation implementation unit 11, the first main controller 12, and the second main controller 14 do not consume power. In operation S41, the input reception unit 13 receives an input signal in the standby mode. In operation S42, the subcontroller 15 controls the second main controller 14 to conduct an initialization for waking up from a sleep mode, in which power is not consumed, and the second main controller is not operating. For example, the subcontroller 15 may send a signal for the initialization to the second main controller 14. The second main controller 14 wakes up from the sleep mode and conducts the initialization based on the signal from the subcontroller 15.

In operations S43, the subcontroller 15 stores the information 171 about the received input signal in the storage unit 17. Alternatively, operation S43 may be carried out before operation S42. Next, in operation S44, the subcontroller 14 verifies whether the initialization of the second main controller 14 is completed. When the initialization of the second main controller 14 has not been completed yet, operation S43 is carried out again. In one exemplary embodiment, one or more input signals may be received for a period of time for the initialization of the second main controller 14. In this case, information 171 about the plurality of input signals may be sequentially stored in the storage unit 17.

When the initialization of the second main controller 14 is completed in operation S44, the subcontroller 15 transmits the information 171 about the input signal stored in the storage unit 17 to the second main controller 14. In operation S46, the second main controller 14 processes the input signal based on the information 171 about the input signal. In operation S47, the second main controller 14 analyzes the information 171 about the input signal and determines whether the input signal corresponds to entrance to the normal mode.

When the input signal corresponds to entrance to the normal mode in operation S47, the first main controller 12 is controlled to operate in the normal mode in operation S48. For example, when a corresponding voice instruction is a power on command, the second main controller 14 generates and transmits an interrupt to the subcontroller 15. The subcontroller 15 controls the first main controller 12 to operate in the normal mode based on the interrupt from the second main controller 14.

When the input signal does not correspond to entrance to the normal mode in operation S47, the second main controller 14 returns to a power saving state of the standby mode and minimizes power consumption in operation S49.

As described above, according to the present exemplary embodiment, the input signal is temporarily stored in the storage unit 17 for the period of time to complete the initialization of the second main controller 14, thereby preventing occurrence of an error when the second main controller 14 processes the input signal after completion of the initialization.

Figure 5:
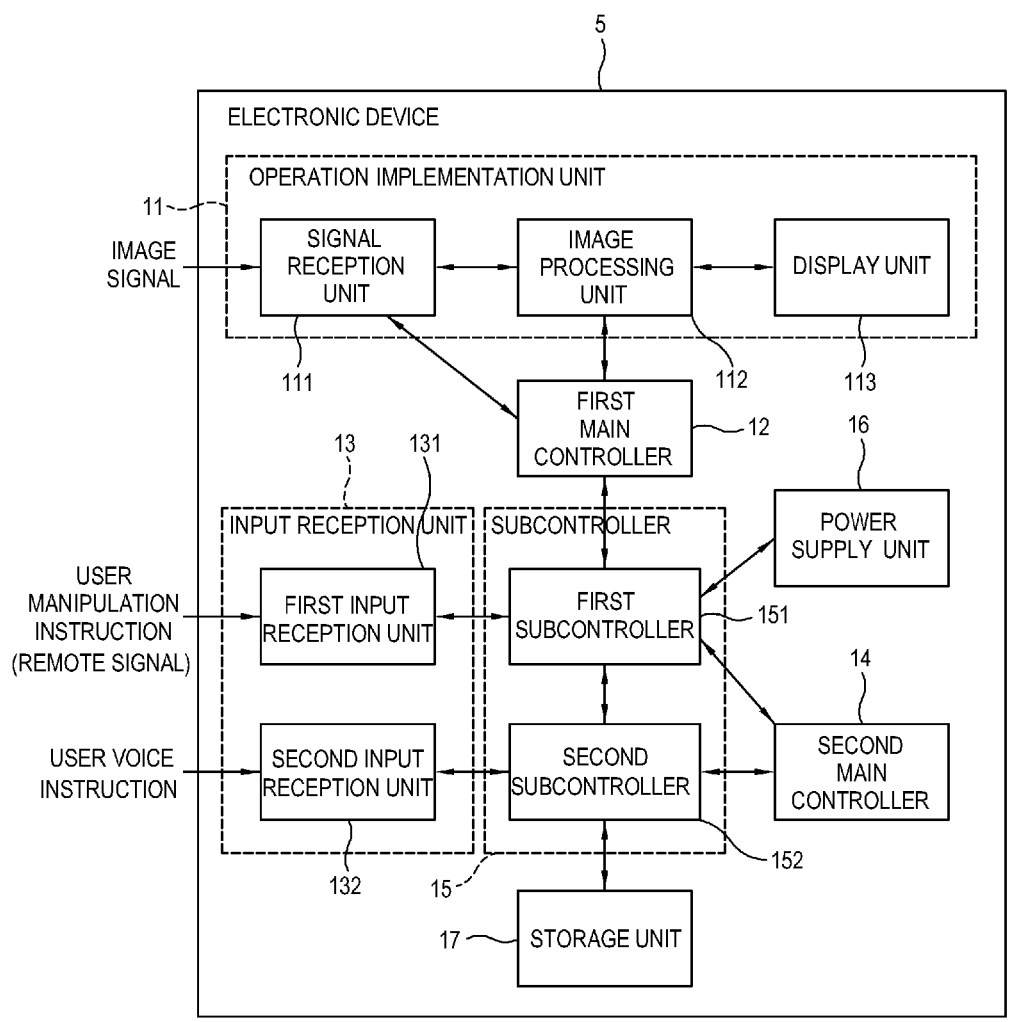
FIG. 5 is a block diagram illustrating a configuration of an electronic device according to still another exemplary embodiment.

FIG. 5 is a block diagram illustrating a configuration of an electronic device according to still another exemplary embodiment. The electronic device 5 includes an operation implementation unit 11, a first main controller 12, an input reception unit 13, a second main controller 14, a subcontroller 15, a power supply unit 16, and a storage unit 17. Equivalent or similar components of the electronic device 5 to those of the electronic devices 1 and 3 described with reference to FIGS. 1 to 4 will be omitted herein.

In the present exemplary embodiment, the electronic device 5 may include a configuration of a display apparatus, such as a TV. That is, the operation implementation unit 11 includes a signal reception unit 111, an image processing unit 112, and a display unit 113. The signal reception unit 111 may receive a broadcast signal from a broadcast signal transmission unit (not shown), for example, a TV broadcast signal, as an image signal, receive an image signal from an imaging device, such as a DVD player and a BD player, receive an image signal from a PC, receive an image signal from mobile equipment, such as a smartphone and a smart pad, receive an image signal through a network, such as the Internet, or receive an image content stored in a storage medium, such as a USB storage medium, as an image signal.

The image processing unit 112 processes an image signal received by the signal reception unit 111 to display an image. The image processing unit 112 may perform decoding, image enhancing, and scaling. The display unit 113 displays an image based on an image signal processed by the image processing unit 112. The display unit 113 displays an image by any method and includes a liquid crystal display (LCD), a plasma display panel (PDP), and an organic light-emitting diode (OLED).

In the present exemplary embodiment, the input reception unit 13 may include a first input reception unit 131 and a second input reception unit 132. The first input reception unit 131 receives an input signal including a user manipulation instruction. The first input reception unit 131 may receive a remote control signal including the user manipulation instruction as an input signal from a remote controller (not shown). Alternatively, the first input reception unit 131 may be configured as a manipulation panel including at least one manipulation key (not shown) on the electronic device 5 and receive an input signal including the user manipulation instruction through the manipulation key.

The second input reception unit 132 receives an input signal including a user voice instruction. For example, the second input reception unit 132 may be configured as a microphone and convert a voice of the user into an input signal. The second main controller 14 is configured to process a voice input signal corresponding to an input signal received through the second input reception unit 132. Alternatively, in addition to a user voice, the second input reception unit 132 may recognize a user image, a user motion, or a gesture to receive as an input signal. In this case, the second main controller 14 is configured to process an input signal of an image or a gesture.

In the present exemplary embodiment, the subcontroller 15 may include a first subcontroller 151 and a second subcontroller 152. The first subcontroller 151 processes an input signal including a user manipulation instruction received through the first input reception unit 131. That is, when an input signal including a user manipulation instruction is received through the first input reception unit 131 in the standby mode, the first subcontroller 151 determines whether the manipulation instruction corresponds to the normal mode. When the manipulation instruction corresponds to the normal mode, for example, when the user presses a power-up key, the first subcontroller 151 controls the power supply unit 16 so that the first main controller 12 operates in the normal mode.

The second subcontroller 152 processes an input signal including a user voice instruction received through the second input reception unit 132. That is, when an input signal including a user voice instruction is received through the second input reception unit 132 in the standby mode, the second subcontroller 152 controls the second main controller 14 to process the input signal as described above with reference to FIGS. 1 to 4.

In one exemplary embodiment, the second subcontroller 152 may include a voice engine capable of conducting voice preprocessing. In this case, the second subcontroller 152 voice-preprocesses a received input signal and transmits information about the voice-preprocessed input signal to the second main controller 14.

In the present exemplary embodiment, the second main controller 14 includes a voice engine capable of processing a voice input signal. The second main controller 14 performs voice analysis of a received input signal, and transmits an interrupt to the first subcontroller 151 when the voice instruction corresponds to entrance to the normal mode. When the interrupt is received from the second main controller 14, the first subcontroller 151 controls the first main controller 12 to operate in the normal mode, as described above with reference to FIGS. 1 to 4. After the voice analysis of the received input signal, when the voice instruction does not correspond to entrance to the normal mode, the first subcontroller 151 returns to a power saving state of the standby mode.

According to one exemplary embodiment, in the standby mode, the first subcontroller 151 consumes a power of about 100 mW, while the second subcontroller 152 consumes a power of about 150 mW. The second main controller 14 consumes a power of about 20 to 30 mW in the sleep mode and consumes a power of about 200 to 300 mW when operating after waking up. Further, since the second main controller 14 operates intermittently, the electronic device 1 may be configured to have an average power consumption of about 500 mW or less in the standby.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A television operable based on a voice instruction of a user, the television comprising:
   a display configured to display an image;
   a main controller configured to control the display to display the image when in a normal mode and to be in a power saving state when in a standby mode;
   a voice input receiver configured to receive a voice instruction of a user;
   a sub-voice recognizer configured to conduct voice-preprocessing of the voice instruction received by the voice input receiver in the standby mode;
   a subcontroller configured to output a control signal in response to the voice instruction being voice-preprocessed by the sub-voice recognizer; and
   a main voice recognizer configured to be in the power saving state when in the standby mode, in response to receiving the control signal output by the subcontroller, process the preprocessed voice instruction, and determine whether the processed voice instruction corresponds to entering the normal mode, wherein the main controller is further configured to operate in the normal mode in response to the determined voice instruction corresponding to entering the normal mode.

2. The television of claim 1, further comprising a storage which stores information about the voice instruction, wherein the main voice recognizer processes the voice instruction based on the information about the voice instruction stored in the storage.

3. The television of claim 2, wherein the main voice recognizer starts an initialization according to the control signal of the subcontroller, and the subcontroller transmits the information about the voice instruction stored in the storage to the main voice recognizer when the initialization of the main voice recognizer is completed.

4. The television of claim 1, wherein the subcontroller is further configured to control the main controller to operate in the normal mode in response to the determined voice instruction corresponding to the entering the normal mode.

5. The television of claim 1, comprising a manipulation input receiver configured to receive a manipulation input instruction in the standby mode, and the subcontroller controls the main controller to operate in the normal mode in response to the received manipulation input instruction corresponding to entering the normal mode.

6. The television of claim 1, further comprising at least one of a signal receiver configured to receive an image signal and an image processor configured to process the image signal to display to display the image on the display.

7. A control method of a television operable based on a voice instruction of a user, the television comprising a display displaying an image, and a main controller controlling the display to display the image when in a normal mode and being in a power saving state when in a standby mode, the control method comprising:
   receiving a voice instruction of a user in the standby mode;
   by a sub-voice recognizer, conducting voice-preprocessing of the received voice instruction;
   by a subcontroller, outputting a control signal in response to the voice instruction being voice-preprocessed by the sub-voice recognizer;
   by a main voice recognizer configured to be in the power saving state when in the standby mode, in response to receiving the control signal output by the subcontroller, processing the preprocessed voice instruction and determining whether the processed voice instruction corresponds to entering the normal mode; and
   by the main controller, operating in the normal mode in response to the determined voice instruction corresponding to entering the normal mode.

8. The control method of claim 7, further comprising storing information about the voice instruction, wherein the processing the voice instruction comprises processing the voice instruction based on the information about the stored voice instruction.

9. The control method of claim 8, further comprising by the main voice recognizer, starting an initialization according to control signal of the subcontroller; and transmitting the information about the stored voice instruction to the second main controller when the initialization of the main voice recognizer is completed.

10. The control method of claim 7, further comprising controlling the main controller to operate in the normal mode in response to the determined voice instruction corresponding to the entering the normal mode.

11. The control method of claim 7, further comprising receiving a manipulation input instruction in the standby mode, and controlling the main controller to operate in the normal mode in response to the received manipulation input instruction corresponding to entering the normal mode.

12. The control method of claim 7, further comprising at least one of, by a signal receiver, receiving an image signal, and, by an image processor, processing the image signal to display the image on the display.

13. A device comprising:
   an operation implementor configured to conduct an operation;
   a first main controller configured to control the operation of the operation implementor;
   an input receiver configured to receive an input signal;
   a second main controller configured to process the input signal when in a standby mode; and
   a subcontroller configured to control the second main controller to process the input signal when the input signal is received in the standby mode,
   wherein at least one from among the second main controller and the subcontroller consumes less power than at least one from among the first main controller and the operation implementor,
   wherein the first main controller and the second main controller are separate elements of the device.

14. The device of claim 13, wherein in the standby mode, at least one from among the operation implementor and the first main controller are not supplied with power.

15. The device of claim 13, wherein in the standby mode, at least one from among the input receiver and the subcontroller is operating.

16. The device of claim 13, wherein in standby mode, the second main controller intermittently operates only when a signal is input.

17. A control method of a device comprising an operation implementation unit conducting an operation, a first main controller controlling the operation of the operation implementation unit, and a second main controller processing an input signal when in the power saving state in the standby mode, the control method comprising:
   receiving the input signal in the standby mode;
   controlling the second main controller to process the input signal; and
   by the second main controller, processing the received input signal;
   wherein the second main controller consumes less power than at least one from among the first main controller and the operation implementation unit,
   wherein the first main controller and the second main controller are separate elements of the device.

18. The method of claim 17, wherein in the standby mode, at least one from among the operation implementation unit and the first main controller are not supplied with power.

19. The method of claim 17, wherein in the standby mode, the second main controller intermittently operates only when a signal is input.

20. The television of claim 2, wherein the main voice recognizer is initialized before storing the voice instruction in the storage.

21. The method of claim 8, further comprising initializing the main voice recognizer before storing the voice instruction.

* * * * *